US005789083A

United States Patent [19]

Thomas

[11] Patent Number: 5,789,083
[45] Date of Patent: *Aug. 4, 1998

[54] AQUEOUS FLUOROPOLYMER PRIMER FOR SMOOTH SUBSTRATES

[75] Inventor: Philippe Andre Fernand Germain Thomas, Helecine, Belgium

[73] Assignee: E. I. du Pont de Nemours and Company, Wilmington, Del.

[*] Notice: The term of this patent shall not extend beyond the expiration date of Pat. No. 5,721,053.

[21] Appl. No.: 837,080

[22] Filed: Apr. 11, 1997

Related U.S. Application Data

[63] Continuation-in-part of Ser. No. 476,997, Jun. 7, 1995, Pat. No. 5,721,053, which is a continuation-in-part of Ser. No. 245,407, May 18, 1994, abandoned, which is a continuation-in-part of Ser. No. 146,811, Nov. 3, 1993, abandoned, which is a continuation-in-part of Ser. No. 995,758, Dec. 23, 1992, abandoned.

[51] Int. Cl.$^6$ ............................................. B32B 27/30
[52] U.S. Cl. ..................... 428/422; 524/463; 524/514; 525/179
[58] Field of Search ........................... 428/421, 422; 524/463, 514; 525/179

[56] References Cited

U.S. PATENT DOCUMENTS

| | | | |
|---|---|---|---|
| 4,139,576 | 2/1979 | Yoshimura et al. | 525/179 |
| 5,168,013 | 12/1992 | Tannenbaum | 428/422 |

*Primary Examiner*—D. S. Nakarani

[57] ABSTRACT

An aqueous fluoropolymer primer useful for coating smooth substrates is provided. The primer contains two fluoropolymer resins of differing melt viscosities and a binder which is a polyamide imide and a polyphenylene sulfide at a weight ratio in the range of 3:1 to 1:3.

2 Claims, No Drawings

AQUEOUS FLUOROPOLYMER PRIMER FOR SMOOTH SUBSTRATES

This is a continuation-in-part of application Ser. No. 08/476,997 filed Jun. 7, 1995, now U.S. Pat. No. 5,721,053, which is a continuation-in-part of application Ser. No. 08/245,407 filed May 18, 1994, now abandoned, which is a continuation-in-part of application Ser. No. 08/146,811 filed Nov. 3, 1993, now abandoned which is a continuation-in-part of Ser. No. 07/995,758 filed Dec. 23, 1992 now abandoned.

BACKGROUND OF THE INVENTION

This invention relates to aqueous fluoropolymer primers for nonstick coating systems that can be applied to smooth substrates.

Generally in the art a metal substrate is roughened by some means before the first layer of coating is applied so that mechanical bonding will assist chemical adhesive means in holding the coating onto the substrate. Typical roughening means include acid etching, sand-blasting, grit-blasting, and baking a rough layer of glass, ceramic or enamel frit onto the substrate. The problem of adhesion of non-stick coatings to substrates is exacerbated by the nature of the coatings. If the coating is optimized for release to prevent food particles from sticking to it, for easy clean-up after cooking or durability, or to facilitate low friction sliding contact, almost by definition there will be difficulties in making it adhere well to the substrate.

The substrate can be metal, often aluminum or stainless steel used for cookware or industrial applications, or it could be used for an industrial article such as a saw made of carbon steel. Whatever the substrate or the application, if it is necessary to roughen the substrate to make the coating adhere, that at least adds cost and can cause other difficulties including creating a rough profile which can protrude through the coating or cause a roughening of the surface both referred to as telegraphing. This is especially undesirable when smoothness is sought, such as for saws and steam irons. The environmental cost of disposing of etchant materials can be significant.

Efforts in the past to provide non-stick roller coatings for smooth substrates include two PCT patent publications of 25 Jun. 1992, WO92/10309 on "Non-stick Coating System With PTFE and PFA or FEP For Concentration Gradient" and WO92/10549 on "Non-Stick Coating System With PTFE Of Different Melt Viscosities For Concentration Gradient," both in the name of H. P. Tannenbaum. Perfluoropolymers such as polytetrafluoroethylene (PTFE) of two different melt viscosities, or PTFE plus a copolymer of tetrafluoroethylene with hexafluoropropylene (FEP) or with perfluoroalkylvinylether (PFA), are used with a binder of polyamide imide (PAI) or polyether sulfone (PES). U.S. Pat. 5,230,961—Tannenbaum (Jul. 27, 1993) teaches the use of PTFE and FEP with PAI and/or PES to give concentration gradients, but without teaching the combination of PAI and polyphenylene sulfone (PPS) needed to give the level of post formability with roller coated needed for some applications.

Post-formable fluororesin-coated articles are taught in U.S. Pat. No. 5,106,682—Matsushita (Apr. 21, 1992), using a roughened aluminum substrate and a two-layer coating of which the first layer is filled and the second layer is not filled. It would be desirable to have a coating system that can be used on smooth aluminum substrates which are to be substantially formed (post-formed) by deep drawing after coating.

Even more challenging is to provide such a coating system that can be applied to smooth substrates by roller coating and still stand up to deep drawing.

SUMMARY OF THE INVENTION

The present invention provides a primer which is an aqueous coating composition comprising a perfluorocarbon resin and a binder consisting essentially of a polyamide imide and a polyphenylene sulfide resin, wherein said perfluorocarbon resin comprises two different perfluorocarbon resins, the first being a polymer of polytetrafluoroethylene having a melt viscosity of at least $10^{10}$ Pa Sec and the second being a copolymer of tetrafluoroethylene and hexafluoropropylene having a melt viscosity in the range of $10^2$ to $10^7$ Pa Sec, the weight proportions being in the range of 50 to 85% of the first such resin and 15–50% of the second such resin based on the total of said first and second resins, the weight ratio of the polyamide imide to polyphenylene sulfide in the range of 3:1 to 1:3, and wherein the weight ratio in the cured coating of fluoropolymer to binder is in the range of 2:1 to 1:1.

In certain of its embodiments, the primer of the invention is useful in a two-layer coating system on a substrate with the coating of the invention as the primer, or a coating system with three or more layers with such a primer and with an intermediate coating which is the cured product of an aqueous coating composition comprising polyphenylene sulfide and polytetrafluoroethylene in weight ratio in the range of about 0.5 to 2.0:6.

In either type of coating system, the topcoat comprises a fluoropolymer resin such as polytetrafluoroethylene, preferably also containing mica and decomposable polymer, preferably with a weight ratio of fluoropolymer to decomposable polymer in the range of 16:0.5 to 16:1.5.

DETAILED DESCRIPTION OF THE PREFERRED EMBODIMENTS

The primer of the present invention permits not only lower cost by avoiding the roughening of the substrate but also smoother coated surfaces which can be advantageous for release of food residues from cookware, and for the gliding effect on steam iron sole plates. Also it can allow application of dispersion PTFE coatings by roller coating techniques on smooth substrates.

The primer of the invention uses at least two perfluorocarbon resins having different melt viscosities, i.e., relatively high and low melt viscosity resins. For the higher melt viscosity, polytetrafluoroethylene is used. This can be straight homopolymer or modified with other monomers in amounts small enough to give a melt viscosity (MV) still over $10^{10}$ Pa Sec. For the lower of the two melt viscosity resins, copolymers of tetrafluoroethylene with fluorinated ethylenepropylene (FEP) are used having a low MV in the range of $10^3$–$10^8$ poise ($10^2$–$10^7$ Pa Sec).

The adhesion of high melt viscosity fluoropolymer coatings to all types of metal substrates, particularly to smooth metal, can be significantly improved through chemically induced stratification or formation of a concentration gradient in the primer, and that can be obtained with the primer of present invention.

The two fluoropolymer resins are used with a polymeric binder which is both a polyamide-imide and a polyphenylene sulfide. This combination imparts a synergistic effect in which the fluoropolymer stratifies away from the substrate interface allowing the polymeric binder to obtain a higher concentration and degree of cure at the substrate interface resulting in improved adhesion. The required cure temperature to achieve this stratification can be modified by the choice of fluoropolymer.

Melt viscosity of perfluoropolymers can be determined by known technique such as that in U.S. Pat. No. 4,636,549—Gangal et al (1987). See Col. 4, lines 25–63.

The primer of the present invention allows the use of coatings on smooth substrates, treated only by washing to remove grease and any other contaminants which might interfere with adhesion. coating systems of the invention give good food release and good resistance to usual durability tests, generally described in U.S. Pat. No. 4,252,859, —Concannon and Vary (1981) col. 2, lines 14–24. The substrate is free of contaminants that would prevent adhesion of the coating.

Typical prior art preparation of surfaces to enhance adhesion of a release coating has involved etching or sand or grit blasting to develop a surface profile. The roughness profile is measured in root mean square (RMS) average microinches from a centerline using a model RT 60 surface roughness tester made by Alpa Co. of Milan, Italy. The profile on typical rolled aluminum after washing to remove grease and contaminants is 16–24 microinches (0.4–0.6 μm). The profile on steel varies more widely but is typically less than 50 microinches (1.3 μm). On both steel and aluminum, before a release coating is applied to profile typically is increased to over 100 micro inches (2.5 μm), preferably for aluminum for some uses to 180–220 micro inches (4.6–5.6 μm). Thus, the primer of the present invention is particularly useful with steel or aluminum substrates having a profile of less than 100, preferably less than 50 micro inches (less than 2.5 μm, preferably less than 1.3 μm).

The primers of the invention can also be used on substrates roughened in various ways known in the art to make coating systems even better than without such primers. This can combine improved chemical adhesion with mechanical effects to produce products that may be superior.

In the following examples, the polyamide imide, colloidal silica and dispersions are known in the art and preferably are those of U.S. Pat. Nos.4,031,286—Seymus (1977) and 4,049,863—Vassiliou.

The following examples provide improved adhesion. The fluoropolymers are provided as 60% dispersions in water. As usual, the solids content of dispersions is indicated in the tables. The compositions were blended by techniques normal in the art and then applied to a smooth, degreased aluminum substrate by roller coating. Percentages, parts and proportions herein are by weight except where indicated otherwise.

An acrylic polyelectrolyte, such as Rohm and Haas PRIMAL RM 5, is used to adjust the viscosity of the coating composition for roller coating application.

The following coating comnpositions are applied by techniques known in the art, preferably by roller coating on circular discs or even by reverse roller coating. Then separate layers are applied wet-on-wet with minimal drying and no curing between coats, then the coated system is cured such as at about 430° C. for at least one minute. Then the two-layer system can be readily stamped, pressed or drawn into a fry pan with a draw ratio of depth to diameter of up to about 0.2:1. The three-layer system can be readily deep drawn into a casserole with a draw ratio of depth to diameter of at least about 1:1 or for an increase in area by stretching up to 30% of the diameter of the disc.

Numerous experiments have shown the ranges of weight ratios of perfluoropolymer to binder and of the ingredients in the binder are needed for optimum performance in terms of scratch resistance, cross hatch and finger nail adhesion, flexibility around a conical mandrel, and non-stick. The necessary ranges of ratios of perfluorocarbon resin to binder resin is 2:1 to 1:1, and of PAI to PPS is 3:1 to 1:3. PAI gives good scratch resistance, and PPS gives more flexibility, needed for formability in deep drawing roller coated substrate.

EXAMPLES

Example 1: Two Coat System—PPS/PAI/PTFE/FEP PRIMER—used with PTFE Topcoat of Example 3

| PRIMER | |
|---|---|
| Weight Percent | Ingredient |
| 1.83 | Carbon Black Pigment |
| 0.92 | Aluminum Silicate Extender |
| 2.13 | "LudoxTM" sodium stabilized Colloidal Silica from Du Pont |
| 8.61 | "TE 3442N" PTFE from Du Pont (MV $10^{10}$ Pa Sec) |
| 5.74 | "TE 9075" FEP from Du Pont (MV 2–4 × $10^3$ Pa Sec) |
| 4.79 | Polyphenylene Sulfide Resin Ryton V1 from Philips Petroleum |
| 4.79 | AI 10 Polyamic Acid aqueous solution from Amoco |
| 0.26 | Sodium Polynaphthalenesulfonate Anionic Surfactant |
| 0.26 | Surfynol 440 Nonionic Surfactant from Air Products |
| 61.16 | Deionized Water |
| 0.31 | Triton X-100 Octoylphenolpolyethoxy Non Ionic surfactant from Union Carbide |
| 0.68 | Diethylethanol Amine |
| 1.35 | Triethylamine |
| 3.72 | Furfuryl Alcohol |
| 2.93 | N-Methylpyrolidone |
| 0.52 | Sermul EN74 Nonylphenol Polyethoxy Non Ionic Surfactant from HULS |

Example 2: Three Coat System

The primer of example 1 is used with the intermediate of this example 2 and the topcoat of example 3 to give a three-layer system.

The resin composition of intermediate PPS, plus PTFE plus Acrysol RM5.

| INTERMEDIATE | |
|---|---|
| Weight Percent | Ingredients |
| 7.53 | Titanium dioxide pigment |
| 2.74 | Carbon black pigment |
| 1.37 | Aluminum Silicate Extender |
| 4.44 | Barium-Sulfate Extender |
| 28.38 | "TE 3442N" PTFE from Du Pont |
| 4.44 | Polyphenylene Sulfide resin Ryton V1 from Philips Petroleum |
| 0.44 | Sodium Polynaphthalenesulfonate surfactant |
| 0.35 | Surfynol 440 non-ionic surfactant from Air Products |
| 0.89 | Diethyleneglycol monobutyether |
| 42.32 | Water |
| 2.40 | Triethanolamine |
| 0.89 | Triton X 100 Non-ionic surfactant from Union Carbide |
| 2.11 | PRIMAL RM5 Acrylic thickening agent from Rohm and Haas |
| 1.70 | SERMUL EP74 Nonylphenylpolyethoxy Non-ionic surfactant from HULS |

The resin composition of the topcoat is PTFE plus PRIMAL RM5.

| TOPCOAT | |
|---|---|
| Weight Percent | Ingredients |
| 4.92 | "Afflair" 153 Titanium dioxide Coated Mica flake from Merck |
| 0.26 | Carbon black pigment |
| 0.13 | Aluminum Silicate Extender |
| 40.65 | "TE 3442N" PTFE from Du Pont |
| 0.04 | Sodium Polynaphthalenesulfonate anionic surfactant |
| 0.35 | Bevaloid 680 anti form agent from BEVALOID |
| 0.90 | Diethylphtalate |
| 38.84 | Water |
| 6.99 | Triethanolamine |
| 1.97 | Triton X100 Non-ionic surfactant from Rohm and Haas |
| 2.51 | PRIMAL RM5 acrylic thickening agent from Rohm and Haas |
| 2.44 | SERMUL EN74 Nonylphenylpolyethoxy Non-ionic surfactant from HULS |

I claim:

1. A composition applicable as a primer for a nonstick coating on a smooth, postformable substrate, comprising: an aqueous dispersion of a perfluorocarbon resin and a binder consisting essentially of a polyamide imide and a polyphenylene sulfide resin, wherein said perfluorocarbon resin comprises two different perfluorocarbon resins, the first being a polymer of polytetrafluoroethylene having a melt viscosity of at least $10^{10}$ Pa Sec and the second being a copolymer of tetrafluoroethylene and hexafluoropropylene having a melt viscosity in the range of $10^2$ to $10^7$ Pa Sec, the weight proportions being in the range of 50 to 85% of the first such resin and 15–50% of the second such resin based on the total of said first and second resins, the weight ratio of the polyamide imide to polyphenylene sulfide being in the range of 3:1 to 1:3, and wherein the weight ratio in the cured coating of fluoropolymer to binder is in the range of 2:1 to 1:1.

2. The composition of claim 1 in the form of a baked layer on a substrate.

* * * * *